US010592483B2

(12) United States Patent
Dennis et al.

(10) Patent No.: US 10,592,483 B2
(45) Date of Patent: Mar. 17, 2020

(54) STATE RECORD SYSTEM FOR DATA MIGRATION

(71) Applicant: SkyKick, Inc., Seattle, WA (US)

(72) Inventors: John Dennis, Seattle, WA (US); Evan Richman, Seattle, WA (US); Todd Schwartz, Seattle, WA (US); Bradley Younge, Denver, CO (US); Manoj Ganesh Panse, Seattle, WA (US)

(73) Assignee: Skykick, Inc., Seattle, WA (US)

( * ) Notice: Subject to any disclaimer, the term of this patent is extended or adjusted under 35 U.S.C. 154(b) by 862 days.

(21) Appl. No.: 15/096,187

(22) Filed: Apr. 11, 2016

(65) Prior Publication Data

US 2016/0292152 A1    Oct. 6, 2016

Related U.S. Application Data

(60) Provisional application No. 62/146,135, filed on Apr. 10, 2015.

(51) Int. Cl.
*G06F 16/21* (2019.01)
*G06F 16/11* (2019.01)
*G06F 16/23* (2019.01)

(52) U.S. Cl.
CPC .......... *G06F 16/214* (2019.01); *G06F 16/119* (2019.01); *G06F 16/23* (2019.01)

(58) Field of Classification Search
CPC ............. G06F 17/303; G06F 17/30079; G06F 17/30345; G06F 16/214; G06F 16/119; G06F 16/23

(Continued)

(56) References Cited

U.S. PATENT DOCUMENTS

| 4,827,478 A | 5/1989 | Chan |
| 6,434,682 B1 | 8/2002 | Ashton et al. |

(Continued)

FOREIGN PATENT DOCUMENTS

| EP | 1215590 B1 | 5/2007 |
| WO | 2013/123097 A1 | 8/2013 |
| WO | 2015/006308 A1 | 1/2015 |

OTHER PUBLICATIONS

'A Strategic Approach to Data Transfer Methods'[online],[retrieved on Jul. 16, 2016]. Retrieved from the internet, URL https://msdn.microsoft.com/en-us/library/aa480064.aspx.

(Continued)

*Primary Examiner* — Michael Pham
(74) *Attorney, Agent, or Firm* — Kilpatrick Townsend & Stockton LLP

(57) ABSTRACT

A system and method for facilitating a migration engine to migrate data items in a data directory from a source system to a destination system over multiple migration passes are disclosed. A state file can be used to track migration states of data items during the life cycle of the migration. The state file can be generated and updated by a plugin to the migration engine. During a migration pass, the state file can be loaded into the memory to influence the migration by the migration engine. Prior to the migration pass, migration profile specifying one or more migration actions can be invoked by a migration routine. The invocation of the migration profile can cause the state file to be modified to perform the migration actions accordingly.

20 Claims, 5 Drawing Sheets

(58) Field of Classification Search
USPC .......................................................... 707/736
See application file for complete search history.

(56) References Cited

U.S. PATENT DOCUMENTS

| | | | |
|---|---|---|---|
| 7,284,045 B1 | 10/2007 | Marl et al. | |
| 7,426,181 B1 | 9/2008 | Feroz et al. | |
| 7,587,455 B2* | 9/2009 | Czeczulin | G06Q 10/107 |
| | | | 709/206 |
| 7,603,419 B2 | 10/2009 | Gardner et al. | |
| 7,647,411 B1 | 1/2010 | Schiavone et al. | |
| 7,761,609 B1 | 7/2010 | Srinivasan et al. | |
| 7,809,598 B2 | 10/2010 | DelGaudio et al. | |
| 7,953,707 B2 | 5/2011 | Hamel et al. | |
| 8,224,924 B2 | 7/2012 | Andersen et al. | |
| 8,285,817 B1* | 10/2012 | Balasubramanian | ........................ |
| | | | G06F 16/119 |
| | | | 709/219 |
| 8,447,826 B1 | 5/2013 | Manmohan et al. | |
| 9,207,873 B2* | 12/2015 | Nelson | G06F 3/0647 |
| 9,582,524 B1* | 2/2017 | Murali | G06F 17/303 |
| 9,729,488 B2 | 8/2017 | Pouzin et al. | |
| 2002/0188732 A1 | 12/2002 | Buckman et al. | |
| 2004/0236749 A1 | 11/2004 | Cortright et al. | |
| 2005/0086457 A1 | 4/2005 | Hohman | |
| 2005/0192992 A1 | 9/2005 | Reed et al. | |
| 2005/0289182 A1 | 12/2005 | Pandian et al. | |
| 2007/0073818 A1 | 3/2007 | Gardner et al. | |
| 2007/0226304 A1 | 9/2007 | Virk et al. | |
| 2007/0271341 A1 | 11/2007 | Kumar et al. | |
| 2008/0028100 A1 | 1/2008 | Adelman et al. | |
| 2008/0109448 A1 | 5/2008 | Aboel-Nil et al. | |
| 2008/0201433 A1 | 8/2008 | McDonald | |
| 2008/0256321 A1 | 10/2008 | Armstrong et al. | |
| 2008/0307178 A1 | 12/2008 | Agombar et al. | |
| 2009/0187632 A1 | 7/2009 | Alarid et al. | |
| 2009/0327192 A1 | 12/2009 | Galgali et al. | |
| 2010/0082777 A1 | 4/2010 | Montgomery et al. | |
| 2010/0172378 A1 | 7/2010 | Arye et al. | |
| 2010/0239255 A1 | 9/2010 | Ikeda et al. | |
| 2011/0004629 A1 | 1/2011 | Thorat et al. | |
| 2011/0264748 A1 | 10/2011 | Pouzin et al. | |
| 2011/0295925 A1 | 12/2011 | Lieblich et al. | |
| 2012/0143894 A1 | 6/2012 | Ferguson et al. | |
| 2012/0158896 A1 | 6/2012 | Tamiya | |
| 2012/0185926 A1 | 7/2012 | Topatan et al. | |
| 2012/0303814 A1 | 11/2012 | Ferris | |
| 2013/0212200 A1* | 8/2013 | Dennis | H04L 51/22 |
| | | | 709/206 |
| 2013/0262638 A1 | 10/2013 | Kumarasamy et al. | |
| 2013/0325800 A1* | 12/2013 | Halevy | G06F 17/30203 |
| | | | 707/620 |
| 2015/0212897 A1 | 7/2015 | Kottomtharayil et al. | |
| 2015/0331774 A1 | 11/2015 | Slikm et al. | |
| 2015/0373106 A1 | 12/2015 | Dennis et al. | |
| 2016/0134571 A1 | 5/2016 | Lindley et al. | |
| 2016/0253339 A1 | 9/2016 | Ambrose et al. | |
| 2016/0261584 A1 | 9/2016 | Dennis et al. | |

OTHER PUBLICATIONS

U.S. Appl. No. 14/814,424, Final Office Action dated Oct. 6, 2016, 28 pages.
U.S. Appl. No. 14/814,424, Non-Final Office Action dated Jun. 6, 2016, 14 pages.
U.S. Appl. No. 14/814,424, Restriction Requirement dated Dec. 31, 2015, 10 pages.
Henseler, Network-based filtering for large email collections in E-Discovery, Journal Artificial Intelligence and Law, vol. 18 Issue 4, Dec. 23, 2010, pp. 413-430.
International Application No. PCT/US2013/026000, International Search Report and Written Opinion dated Jun. 21, 2013, 11 pages.
Stackoverflow, 403 Forbidden vs 401 Unauthorized HTTP responses, Jul. 21, 2010, pp. 1-7.
Zhou, Mining organizational emails for social networks with application to Enron corpus, ProQuest LLC, Jul. 2008, pp. 1-180.
Non-Final Office Action for U.S. Appl. No. 15/061,945, dated Feb. 16, 2018.
U.S. Appl. No. 15/061,945 , "Final Office Action", dated Feb. 26, 2019, 12 pages.
Non-Final Office Action for U.S. Appl. No. 15/061,945 dated Aug. 7, 2019. 13 pages.

* cited by examiner

STATE RECORD SYSTEM FOR DATA MIGRATION

CROSS-REFERENCES TO RELATED APPLICATIONS

This application claims benefit under 35 U.S.C. § 119(e), of U.S. Patent Application No. 62/146,135 filed on Apr. 10, 2015 for "STATE RECORD SYSTEM" the entire disclosure of the above mentioned application is incorporated by reference for all purposes.

BACKGROUND

The disclosure generally relates to data migration from a source system to a destination system. Specifically, the disclosure relates to invoking a migration profile multiple times to migrate data items in a data directory in multiple passes.

Data migration typically involves migrating data from a source system to a destination system. In an ideal scenario, data on the source system is migrated to the destination system in one pass without errors. However, in practice, such an ideal scenario does not often happen. Errors typically occur during data migration, which will require data to be migrated correctly again from the source system to the destination system. For example, when migrating an email message with multiple attachments, errors can occur when not all of the attachments are migrated correctly in an initial pass. In that case, the email message and its attachments need to be migrated again to the destination system in a second pass. In some situations, the data migration may take place over a period of time so that one or more passes subsequent to the initial pass are needed to migrate new data or data changes between the individual passes.

Conventional data migration engines that perform data migration do not typically have built-in state to keep track of migration state of individual data items during multiple passes of the data migration. Since no state information are kept, those engines typically re-migrate all the data items in subsequent pass(es) to the initial pass. This can be time consuming and unnecessary when most data items are already correctly migrated to from the source system to the destination system correctly in the initial pass.

As an improvement, some migration systems with stateless engines are integrated with a central database to which all the components of the system connect to access and write data (e.g. the minimal amount of data required to retain enough state to accomplish the migration engine's goals, such as syncing content on multiple passes). However, it is often difficult and time-consuming to build and maintain a central database that could scale up and down with the elastic nature of such migration systems. And if the central database crashes, then the entire migration system may crash. This central point of failure may create unacceptable risk for many data migrations, which are often critical to businesses to be completed quickly and efficiently.

Embodiments address these and other problems, individually and collectively, with an alternative to using a central database for persistence.

BRIEF SUMMARY

Embodiments can facilitate a migration engine to migrate data items in a data directory from a source system to a destination system over multiple invocations of a migration profile. During an initial pass of the migration, a state file comprising state records for the data items can be generated. Each of the state records can comprise one or more fields specifying various information regarding a migration state of the data item. The field(s) can include a field indicating a next action to be performed for the data item during a next pass of the migration. In some examples, the next action can specify that the data item is to be skipped (i.e. not to be re-migrated), migrated (i.e., make a copy of the data item on the destination system), delete (i.e., delete the migrated copy from the destination system), or replaced (i.e., replace the copy of the data item on the destination system with the copy on the source system). Prior to the next pass of the migration, the state file can be loaded into memory of a server computer. During the next pass, the migration engine can migrate individual data items according to the next actions for the data items as specified by the state records in the state file.

For facilitating the migration of the data items in the next pass, the migration profile can be created or updated with one or more migration actions. For example, the migration profile can specify that certain data items matching a criteria (e.g., email messages from a certain sender) are to be re-migrated to the destination system regardless whether they were migrated successfully in the initial pass. The migration profile can then be invoked by a migration routine prior to the next pass to modify the state records in the state file in accordance with the migration action(s) specified by the migration profile. For example, the next actions in the state records for the email messages from the certain sender can be modified to specify those email messages are to be replaced on the destination system if they have been migrated to the destination system in the initial pass, or to be migrated to the destination system if they have not been already migrated to the destination system (e.g., error or new data).

In certain exemplary implementations, a plug-in to the migration engine can be used. The plug-in can be used to read, write to and/or process individual state records in the state file. In some examples, the plug-in can include a state tracker component configured to identify an event that takes place during migration of an individual data item. For example, the state tracker can be configured to identify an event whether the data item succeeds or fails to be migrated to the destination system; or to identify an event whether all data associated with the data item succeeds or fails to be migrated (e.g., the email message is migrated, but an attachment to the email message was not successfully migrated).

In some examples, the plug-in can be configured to determine a next action to be performed for each of the data items based on the event identified for the data items. For example, the plug-in can determine a next action to be "migrate" for those data items that failed to be migrated as indicated by the event; or the plug-in can determine the next action to be "skip" for those data items that succeeded being migrated as indicated by the event.

Other embodiments are directed to systems and computer readable media associated with methods described herein.

A better understanding of the nature and advantages of embodiments of the present invention may be gained with reference to the following detailed description and the accompanying drawings.

TERMS

Figure 1:
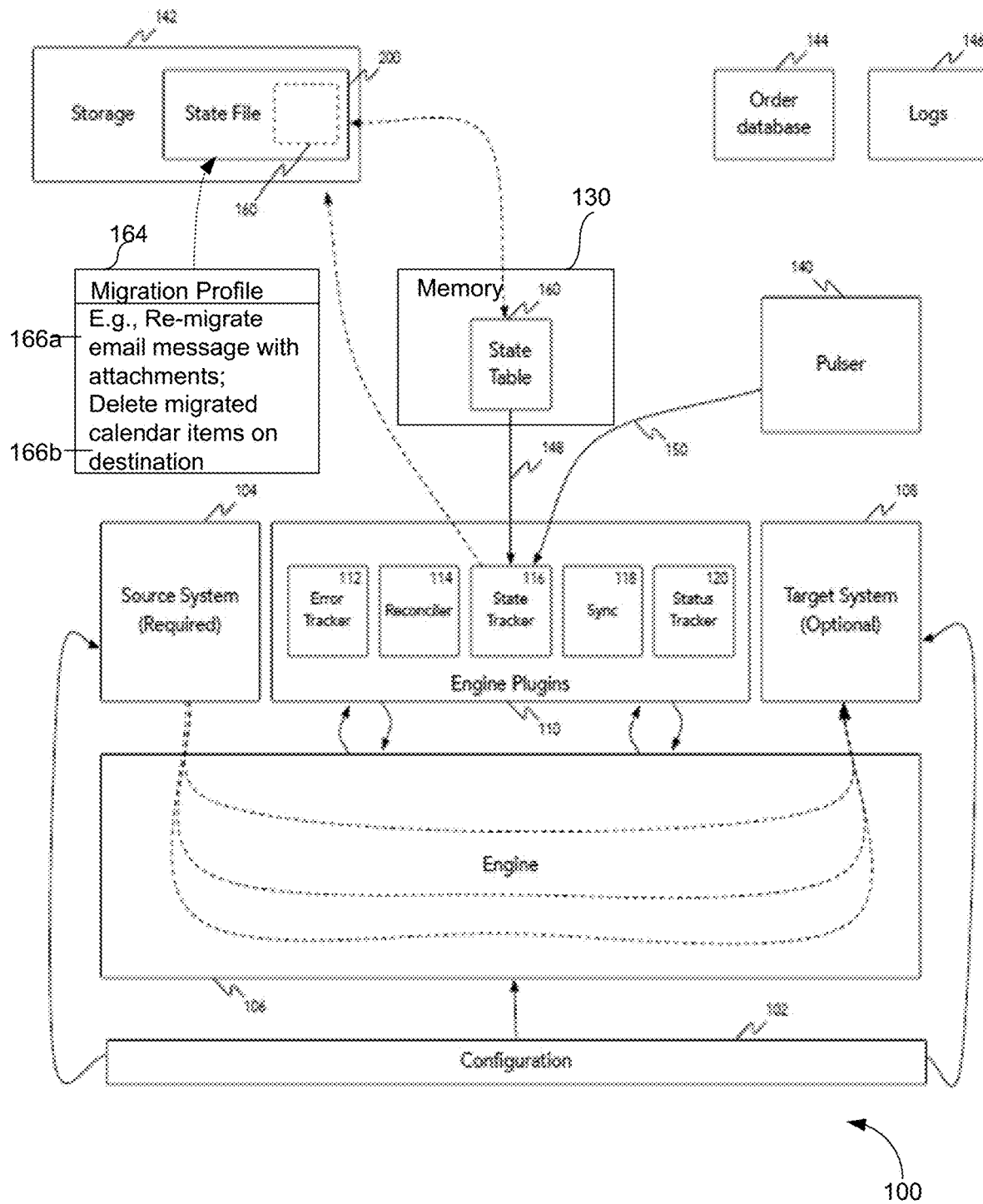
FIG. 1 is a schematic diagram of the architecture of a migration system for migrating data from a source system to a destination system with a state record file according to some embodiments.

Data items that can be migrated in accordance with the disclosure can include file items, electronic mail items, and/or any other type of data items. A file item may be referred to a file resource on a file system for persistently storing information, which may be available to a computer program. An electronic mail item may be referred items implemented and provided by an electronic mail program. Examples of an electronic mail item can include an electronic mail message, a calendar item, a contact item, a task item, a contact item, a note item, just to name a few.

A data directory is a cataloging structure which can contain data items and sub-directories. For example, a data directory may contain one or more data items and sub-directories at the opt most level of the data directory. Each of the sub-directories can comprise its own data item(s) or sub-directory (or sub-directories). Examples of a data directory can include a mailbox, a file folder, a calendar, a task list, a note list, a contact list, and/or any other types of data directory.

A data system is a system that can store data items for use by a user through the user's computer. Examples of a data system may include a file system, a network storage system, an electronic mail system, a cloud-based system, an application server and/or any other data systems. In implementations, the data system can be configured to include a data storage to store the data items; or the data system can be configured to store the data items on one or more remote storage locations operatively connected to the data system, for example a remote data center, a remote cloud server or any other types of remote data storage. The source system and the destination system described herein are data systems.

A migration pass is referred to a repetition of a migration process for migrating data items in a data directory from a source system to a destination system. During a life cycle of the migration of the data items, multiple migration passes can be performed.

DETAILED DESCRIPTION

Various embodiments can facilitate a migration engine to migrate data items in a data directory from a source system to a destination system over multiple invocations of a migration profile. Some embodiments accomplish this by generating and maintaining states of individual data items throughout the life cycle of the data migration with a structured file passed into memory. The structured file or the state file can be used by the migration engine and/or a migration engine plugin to determine one or more actions to be performed on the individual data items in a particular pass of the migration. The state file can comprising state records for individual data item, wherein a given state record can indicate a next action to performed on a given data item in a next pass of the migration.

In some embodiments, the state file may represent all of the intelligence needed for the migration engine to run a migration. The state file may be serialized, highly compressed in data storage (e.g., a hard disk), and structured as a table to enable the management of large-scale transfers of atomized content (i.e. the items moved from a source system to a destination system). In this sense, the file can act as a "cached database" that operates entirely in memory to optimize the migration engine with automated actions while capturing all metadata associated with items moved from the source system to the destination system.

Thus, with the state records for the individual data items, the state file can provide a capability to execute individual passes of the migration in a more granular way than the conventional migration systems. In some embodiments, a migration profile is employed to assist the migration engine to migrate the data items in multiple passes. The migration profile in those embodiments can be used to specify certain migration action to be performed on one or more of the data items. For example, the migration action in the migration profile may indicate that certain data items matching a criteria may be migrated from the source system to the destination system regardless whether these items exist on the destination system. In those embodiments, the migration profile can be invoked by executing a migration routine. The invocation of the migration profile can cause the state records for those data items—i.e., the data items matching the criteria—to be modified such that the next action in the state record for each of those data items reflects the migration action specified by the migration profile.

From an operational perspective, the state file can be used to indicate migration states for the individual data items and next actions to be taken during the life cycle of the migration. The migration engine can be used to perform those actions and emit metadata for each data item so that the state file may be updated to indicate the latest migration states of the individual data items. The migration profile can be used to override the next actions in the state records with desired migration action(s) during the life cycle of the migration. This can allow the migration engine's resources to be focused on migrating data items, which increases the speed, efficiency and reliability of a migration.

I. State Record System Architecture

FIG. 1 shows an embodiment of a migration system 100 in accordance with the disclosure. As shown, migration system 100 can comprise a migration engine 106, a configuration 102, an engine plugin 110, a source system 104, a destination system 108, one or more of storage 142, a state table 160, an order database 144, a state file 200 and/or any other components.

A. Configuration

The configuration 102 can represent configuration of migration system 100. For example, configuration 102 can include static values that seed migration system 100, the number of connections to maintain from the source system 104 to the destination system 108, the interval of a pulser 140 (described in more detail below), threads in the thread pool, etc. The configuration 102 may exist in a number of forms; for example it may be serialized to a specific file format, or may exist as a code object (e.g. an API feature). The configuration 102 may be set in various ways. In some embodiments, it can be selected from a hard-coded set of defaults. In other embodiments, specific settings may be chosen using UI components in an order database 144 (described in more detail below).

The configuration 102 can provide some ability to externally affect the performance of migration system 100. For example, it allows a migration operation team to manually dial back the throughput of a migration to maintain optimal server resources or bandwidth. In some embodiments, configurations embodied by configuration 102 may be made automatically by the system itself. In one embodiment, the configuration 102 can specify the interval on which the state file 200 is saved. In another embodiment, the metadata can be streamed, rather than saved on an interval.

In some embodiments, the source system 104, destination system 108, and migration engine 106 may be configured using configuration 102. In some embodiments, configuration 102 is applied at the beginning of a migration to create a management object. The management object can create and hold references to objects of migration system 100 during the course of a migration. The management object can determine when persistence is needed and add a state persistence object (that manages the state file) to the system when it is needed.

B. Migration Engine

The migration engine 106 can be configured to perform data item migration between the source system 104 and the destination system 108. Migration engine 106 can include logic that drives data migrations. Migration engine 106 can trigger system-specific behavior depending on the operation to be performed. For example, migration engine 106 can be configured with logic that performs header queries on data items on the source system 104.

The migration engine 106 may be involved in some aspects of discovery to figure out what data in the source system 104 may be migrated to the destination system 108. The migration engine 106 can query the source system 104 for metadata according to a number of parameters, e.g. type of source system 104, concurrency, threading specifications, etc. The migration engine 106 then uses the metadata to drive downstream operations like migrating, replacing, skipping, or deleting data.

The migration engine 106 may trigger the start of a migration by executing a migration routine. The migration engine 106 can be configured to generate instructions to cause migration of a particular data item from source system 104 to destination system 108. For example, the instructions generated by the migration engine can include an instruction that cause the destination system 108 to create a version of a data item on the source system 104 and cause the source system 104 to copy data in a current version of the data item from the source system 104 to the destination system 108.

The migration engine 106 can be configured to receive status information indicating whether a data item in a data directory (e.g., batch, folder content, folder, mailbox) succeeds or fails in being migrated to the destination system 108. For example, the status information for the data item can indicate when the migration of the data item started, steps taken to migrate the data item, whether the data item was completely migrated to the destination system 108, if the data item was not completely migrated to the destination system 108, portion or percentage of the data item that was migrated to the destination system 108, and/or any other status information regarding the migration of the data item.

The migration engine 106 can be configured to receive event information regarding one or more events that took place during the current migration pass. For example, the events can include a system message indicating an error has occurred during the migration of the data item (e.g., network error, disk is full, data item being locked and so on), information indicating a migration error when migrating the data item (e.g., one or more attachments in the data item cannot be found on the source system 104), and/or any other events. The migration engine 106 may emit these events as they occur. Emitting these events can allow engine plugin 110 to track those events.

C. State Record, State Table, and State File

State file 200 can offer persistence for the migration system 100, and represent what has been done in a migration on an ongoing structured basis. In some embodiments, a state record, and a state table 160 can be employed in connection with state file 200. A state record may be a record that holds the signature for a single data item, as well as any relevant metadata about the data item. The state table 160 may be a collection of state records. The state file 200 may be the serialized, at-rest version of the State Table after it has been transferred to a storage location (e.g. a network available cloud storage system).

As an alternative to maintaining a central database for persistence, state file 200 can be a "cached database" that operates entirely in memory. State file 200 may be structured to enable the management of large-scale transfers of atomized content (e.g. email messages). For example, state file 200 may be structured as a JSON serialized file that is highly compressed at rest in storage. State file 200 may be less expensive to implement than a central database for persistence. Additionally, the use of state file 200 may be more network efficient than making calls to a central database. An example of state file is provided in FIG. 2.

In some embodiments, state table 160 is an incarnation of the state file 200 after the state file 200 is loaded into memory. The state table 160 can comprise state records 240 identifying every data item (e.g. every email in an email migration) with the signature of the item. In certain embodiments, the signature consists of a composite key, e.g. an item identifier (item ID) offered by the source system 104 and the folder path of the item in the source system 104. State table 160 may hold the history of operations performed for each data item, including dates and timestamps. The state table 160 may be generated and written to, for example by a state tracker 116, described in more detail below.

In some embodiments, the migration engine 106 may not have direct access to the state table 160. In those embodiments, the state tracker 116 is configured to perform a lookup in the state table 160 to determine such information, modifies the next action (e.g. "migrate" or "skip") in the appropriate state record 240 in the state table 160 to be performed in subsequent passes accordingly, and stores the state records 240 in the state file 200 so that the migration engine 106 may perform the next actions specified in the state records 240. For example, upon a successful migration of a data item, the state tracker 116 may change the action associated with that item in the state table 160 to "skip," so that the migration engine 106 skips the item on the next pass, rather than migrating it again.

Figure 2:
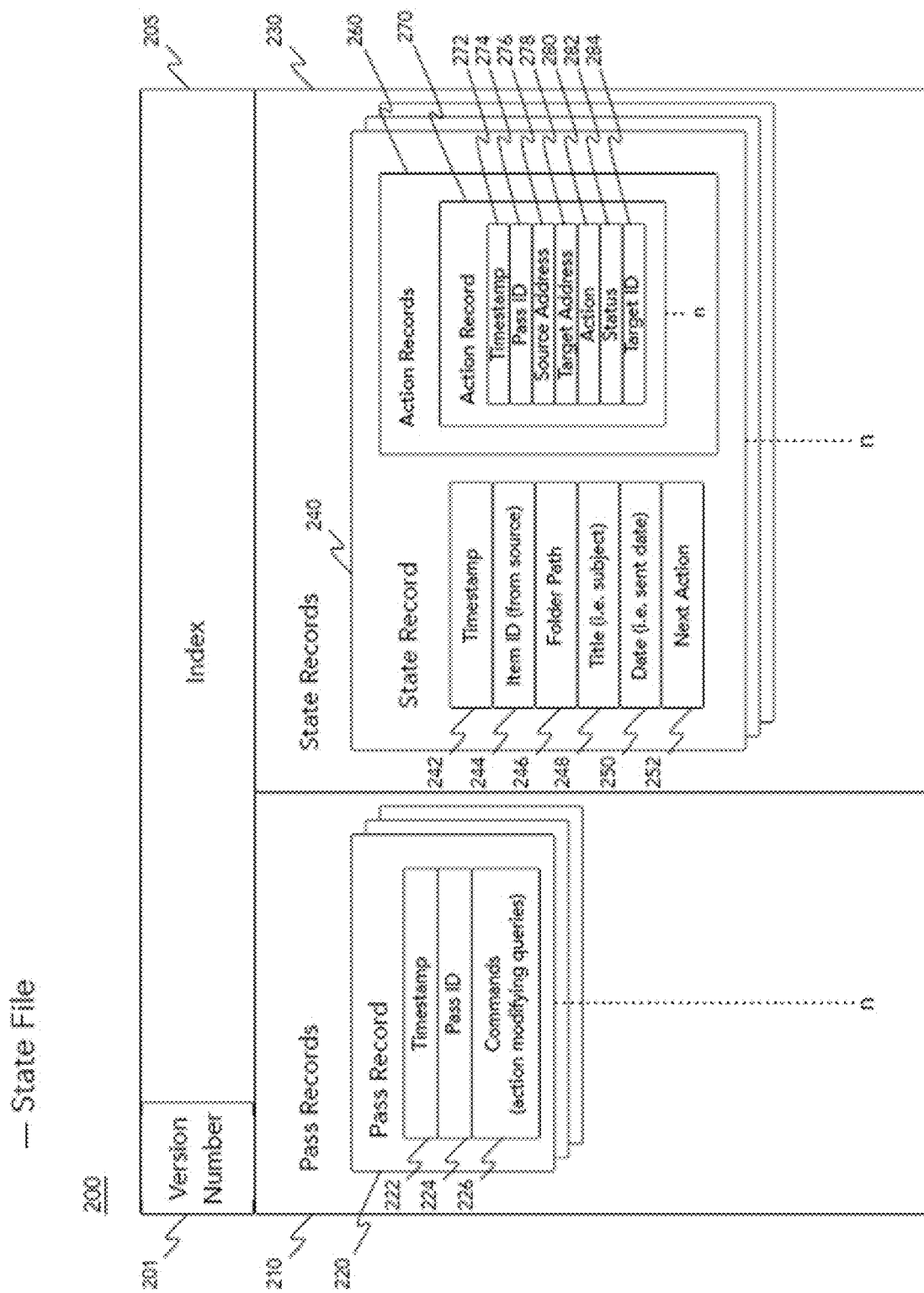
FIG. 2 is a schematic diagram of a state record file according to some embodiments.

In one implementation, the state file 200 can represent migration states (e.g., as shown in FIG. 2) of the data items being migrated from the source system 104 to the destination system 108. The data and structure can be serialized to storage 142 during and between passes. The state table 160 can correspond to the logical structure within this architecture that stores the state records 240 of the state of each individual item.

In some embodiments, the state file 200 may be modified between passes. For example, it can be possible to re-migrate all the items in a data directory in subsequent passes.

For achieving that, the next action for the data items can be reset back to "migrate" from "skip" (see below for more detail on how actions may be changed). For example, a migration routine, such as a migration script, can be executed to invoke a migration profile 164 to modify the state records 240 in the state file 200.

In some embodiments, each event (described in more detail below) that is emitted by the migration engine 106 can trigger a lookup into state file 200. To expedite such lookups, an index of records (described in more detail below) may be generated by the migration system 100 upon loading the state file 200 into the migration system 100 prior to a migration. This obviates the need to keep a reference to the data items as it moves through the migration engine 106. Whenever the state tracker 116 deems it necessary to perform an action with a state record 240 (described in more detail below), state tracker 116 can be configured to look up the state record 240 and make the adjustment, such as recording the results of an migration operation or changing the intended next action (migrate, skip, replace, delete), on an ongoing basis until the migration is complete.

In some embodiments, the state file 200 may help to optimize debugging operations for a migration. Consider the following example: Creating a null target can cut down on debugging time. For example, if a large chunk of data is not migrated successfully, the history of the migration may be "re-played" forward to the point where an error was encountered. To do that, a copy of the state file 200 may be made, and it can be analyzed to identify the data object where the error is found. The file describes everything that was migrated successfully, which means more intensive work (e.g. performing operations at the destination system 108) can be avoided.

D. Migration Profile

In some embodiments, as shown in FIG. 1, a migration profile 164 can be employed to influence the migration by migration engine 106. In some implementations, the migration profile 164 can be created or updated by an administrator of the migration system 100 via a graphical user interface. However, this is not the only case. In some other implementations, the migration profile 164 can be created or updated by migration system 100. For example, the engine plugin 110 can be configured to create and/or update the migration profile 164 automatically in accordance with one or more predefined rules. Still in some other implementations, the migration profile 164 may be updated by a migration routine. For example, the migration routine can include a script that can be run on a consistent basis, for example on a nightly basis. In that example, the script can be run every night to update the migration profile 164 in accordance with one or more rules configured into the script. For instance, the one or more rules may specify that next actions for all failed data items in the state records 240 for those data items should be set to "migrate". The one or more rules may specify that next actions for data items that had changes on the source system 104 after the previous pass of migration should be set to "replace". The one or more rules may specify that next actions for data items that had been deleted on the source system 104 after the previous pass of migration should be set to "delete". The one or more rules may specify that next actions for data items that were successfully migrated during the previous pass should be set to "skip" and so on. However, this is not necessarily the only case. In some other implementations, the migration profile can be updated as part of a migration pass. For example, the migration routine can invoke the migration profile first and then trigger the migration engine to start migrating the data items.

In any case, the migration profile 164 can be invoked by the migration routine, such as a script. The invocation of the migration profile can cause the next actions in certain state records 240 to be modified in accordance with the migration action(s) 166 specified in the migration profile 164. A given migration action 166, such as 166*a* or 166*b*, can specify an action to be performed on one or more data items matching certain criteria during a next pass of the migration by the migration engine 106. For example, the migration action 166*a* in this example specifies that email message items with attachments should be re-migrated in the next pass regardless whether those items were successfully migrated during the previous pass. Essentially, the migration action 166*a* serves as an override action to override next actions in the state records 240 for those items. As another example, the migration action 166*b* specifies that calendar items that have been migrated to the destination system 108 should be deleted on the destination system 108, perhaps because the destination system 108 ran out of capacity to manage the calendar items.

In some examples, invocation of migration profile 164 can take place multiple times during the life cycle of the migration. For instance, the migration profile 164 can be invoked by a migration script prior to every pass of the migration to modify the state records 240 in the state file 200 as described above. However, this is not intended to be limiting. The migration profile 164 can be selectively invoked as however desired. For example, the invocation of the migration profile 164 can be selectively performed by the administrator of the migration system 100 for certain passes of the migration, but not for other passes.

E. Engine Plugins

Engine plugin 110 can be configured to extend the limited functionality of the migration engine 106 beyond moving content from the source system 104 to the destination system 108. In some embodiments, engine plugin 110 receive messages from an event system that provides a view into what is happening in the migration engine 106. In some embodiments, the event system may be an abstraction layer on top of the migration engine 106 that allows the migration engine 106 to emit various messages, e.g. indicating that steps of a migration have started, finished, or failed. In some embodiments, engine plugin 110 subscribe to the broadcast of events emitted by the migration engine 106, and the migration engine 106 is unaware of which, or how many (if any) plugins are operating The events in the migration engine 106 can provide a basis for which engine plugin functionality may be added. Engine plugin 110 are designed to track a specific set of events and perform additional functionality within the migration system. A reference to the migration engine 106 gets passed into the engine plugin 110, so they can start tracking events.

Various embodiments include different engine plugin 110. See below for more description on some example engine plugin 110.

1. Error Tracker

In certain embodiments, an engine plugin component (hereinafter referred to as an error tracker 112) monitors failure events to generate item level reports. Each event type (e.g. mailbox, folder, batch, item) that starts has analogous failure events. So, if an error occurs while a particular operation runs, the migration engine 106 can emit that failure event and the error tracker 112 reads it.

If, for example, a source system 104 crashes, a network error may be received for every object that is attempted to be migrated because there is no logic in the migration engine 106 directing it to stop running the migration algorithm. Error tracker 112 may read the errors and direct the migration engine 106 to shut down until the source system 104 is back up and running. This prevents calls on the source system 104 when it is offline, which saves energy, effort, and makes the migration more efficient.

Any time an item fails to migrate to the destination system 108, for any reason, it is considered an error—even if it fails for a reason that is impossible for the person carrying out the migration to do anything about. For example, if someone is trying to migrate a 35 MB file item, but the destination system 108 accepts a maximum file size of 25 MB. The error tracker 112 may classify errors and determine if an error is "expected" or "unexpected". Tracking expected errors in the source system 104 and destination system 108 can help manage the migration customer relationship.

The error tracker 112 may be configured to temporarily store errors it receives in a lookup table. When the migration finishes, the error tracker 112 can send the lookup table back into the controller code and order database that drives workflows based on the table of errors.

In some embodiments, the error tracker 112 may send a compressed file of select source content to storage 142 as an emergency backup, where the source content is retrievable but it is not being accepted by the target system, e.g. a message with an attachment that exceeds the maximum allowable size in the target mail system.

2. Reconciler

In some embodiments, an engine plugin component (hereinafter referred to as a reconciler 114) can be configured to report certain statistics to the order database 144. For example, at the beginning of a migration, the reconciler 114 can count the number of data items on the source system 104 and the destination system 108. And at the end of the migration, the reconciler 114 can count the number of data items on the destination system 108. These numbers may be compared by the reconciler 114 and reported to the order database 144. This reporting can be used to serve as a marker for whether data failed to migrate, and validate whether failures were due to a problem with the migration engine 106 (there may be other reasons why data marked for migration does not show up at the destination system 108, for instance because of a delete policy on the destination system 108.

3. State Tracker

In some embodiments, an engine plugin component (hereinafter referred to as a state tracker 116) can be configured to obtain information from the state table 160, and generate/update the state file 200 using the obtained information. The state tracker 116 can be configured to provide an ability to read events emitted from the migration engine 106 and analyze the events for appropriate actions to be taken on the data items related to the events.

In some embodiments, the state tracker 116 can be activated for all item level events (see below for more description on item level events). At item start events, state tracker 116 can create new state records in the state table 160 for any new data items that are encountered (e.g on an initial migration pass when there is no state yet, or on subsequent passes when one or more new data items exist in the source system 104 that were created between passes). For new state records, state tracker 116 can enable the migration engine 106 to take the default action, (e.g. migrate the item). For an existing state record, state tracker 116 can enable the migration engine 106 to take the next action as specified by the state record 240 (see below for more description on the action table), e.g. migrate, skip, delete, replace, etc.

The following examples illustrate the above description. If an item event indicates a given data item is successfully migrated to the destination system 108, state tracker 116 can be configured to update the state file 200 to specify that the given data item now exists at the destination system 108 and modify the next action in the state record for the given data item to indicate "skip" the data item. If an item event indicates the particular data item fails to be migrated, state tracker 116 can update the state file 200 to indicate that the data item does not exist at the destination system 108 and modify the next action in the state record for the given data item to indicate "migrate" the data item. On an item start event, the state tracker 116 can be configured to perform a lookup into the state table 160 and send state records for individual data items to the migration engine 106 so the migration engine 106 can perform the next action (e.g. migrate, skip, delete, replace). State tracker 116 may also send a signal to the migration engine 106 to adjust the behavior.

4. Sync

In some embodiments, an engine plugin component (hereinafter referred to as a sync plugin 118) monitors every data item with a signature (i.e. an item ID and folder path from the source system 104) and syncs certain metadata associated with those data items to any corresponding existing data items on the destination. For example, in an email migration, a "flag" placed on an email message would be synced to the email message at the destination system 108. Thus, the sync plugin 118 gives the migration system 100 flexibility to migrate certain data on an ongoing basis. With it, data can be migrated to ensure that all the user interactions are accounted for and up to date.

5. Status Tracker

In some embodiments, an engine plugin component (hereinafter referred to as a status tracker 120) provides real time insights into the migration process. Status tracker 120 observes summary level information of other plugins (e.g. error tracker 112, reconciler 114, state tracker 116, the sync plugin 118, etc.) and uses this information to generate real-time feedback about the system that it sends to an order database 144 and/or a log 146 for viewing.

Status tracker 120 may use the state tracker 116 to get specificity into events. For example, if a delete operation succeeds, it may simply be counted as a successful event. However, it may be desirable to file the event specifically as a delete operation rather than a migration operation. Status Tracker 120 may be used to retrieve the information about the operation (indicating that it was a delete operation) from the state tracker 116 housing the state table 160. This information can be used by the status tracker 120 to create summary information that may be presented to people monitoring the migration.

Summary information may be generated in real-time or on a periodic basis (e.g. once every 30 seconds). For example, a pulser 140 (described in more detail below) may emit information received by the status tracker 120 on a periodic basis to an order database 144 and/or log 146.

F. Pulser

In some embodiments, a pulser 140 may act as a timer that fires an event at a regular frequency (e.g. once every 20 seconds, once every 30 minutes, etc.), which may be observed by engine plugin 110. The events can be subscribed to and used by engine plugin 110 to do work that needs to be done on a periodic basis during a migration (e.g. provide feedback to other systems, save state to external storage media, do memory cleanups, etc.). For example, if an engine plugin 110 wants to be informed about migration progress, the state tracker 116 can fire a callback on a regular interval corresponding to the pulser 140, reporting that progress. Or, if an engine plugin 110 wants to observe how many and what types of errors are occurring so it can make a decision about whether or not to shut down a migration, it can receive error reports from the error tracker 112 on the pulser interval.

The pulser 140 may run independently of the migration engine 106, so that variations in the source system environment (e.g. a source server crash) and variable frequency of events do not distort or conceal the status of the migration. These limitations could exist if the data emissions were directly tied to the throughput from the migration engine 106, as all engine activity is driven by data from the source system 104. If the source system 104 crashes, the pulser 140 can continue to emit updates.

In some embodiments, the pulser 140 can trigger events at certain times. Some plugins may require regular event triggering, regardless of the progress on the engine. For example, status reports may be triggered by the pulser 140 as snap shots of the State File 200, sent to storage 142. The pulser 140 can keep all plugins reporting on the migration engine 106 in sync at 150 and can replace ad hoc reporting code for each plugin.

G. Storage

Certain data related to a migration may be sent to a database where it may be stored (hereinafter referred to as storage 142). For example, the state file 200 may be loaded into memory at the beginning of a migration pass, and periodically saved or flushed to storage 142 during and after the migration pass; this can allow state to be retained between migration passes. "Snapshots" of the state file 200 may be taken by the state tracker 116 and sent to storage 142 by the pulser 140. Such snapshots may represent the entire history of actions taken on a data item (the state file 200 may only contain a limited number of the most actionable, most recent passes to save memory).

H. Order Database

In some embodiments, an order database 144 stores user account information and the connection information for seeding a migration. The information in the order database 144 may be originally received from a customer or may be created based on a customer order. During the life cycle of the data migration, the order database 144 can be used to present an audit trail from the user perspective.

I. Logs

In some embodiments, certain components in the migration create log 146 of system activity. Log 146 provide an audit trail for troubleshooting, and every unit of functionality throughout the entire platform may have access to the logs. Logs may be stored in a number of ways, for example in an external database on a permanent or temporary basis (e.g. retained for two weeks).

II. State Record

As described above, in certain embodiments, state table 160 is a set of state records for every item on the source system 104 (and as described above, state file 200 may be a serialized, at-rest version of the state table 160 after it has been transferred to a storage location, and the state table 160 is an incarnation of the state file after the state file 200 is loaded into memory). The state file 200 may have a version number 201 (as shown in FIG. 2), to enable version-specific commands. For example, state tracker 116 can perform operations specific to the version of the state file 200, e.g. instructing the migration engine 106 to re-migrate certain items based on version x of the state file 200.

A. Index

In certain embodiments, an index 205 (as shown on FIG. 2) of the contents of state file 200 is dynamically generated, which may contain certain characteristics of the records in the file. The state table 160 can be stored in state file 200 and contain a list of state records 230. For example, the index 205 may contain, for each record in the index 205, the record's signature and a pointer to the record's location in memory. The index 205 may be accessed when a search of each event occurs. This enables the record associated with an event to be found and accessed more quickly, without have to check the entire state file 200 for each lookup operation.

B. Pass Records

In some embodiments, as shown in this example, the state file 200 may contain a pass records list 210 comprising one or more pass records 220. A given pass record 220 can identify when a particular action happened to a data item, and what commands may have influenced that action. Each pass record 220 may include a number of details. For example, as shown, the pass records 220 may contain a timestamp 222 that includes the date and time the pass was generated, a unique pass ID 224 that can be auto-generated for each pass, and a list of commands 226. The commands may be action-modifying queries that change the next action 252 in a state record 240, described in further detail below.

C. State Records

In some embodiments, the state file 200 may contain a record list 230 comprising one or more state records 240. Each of the state records 240 may correspond to a data item on the source system 104 that is being migrated. The format of state record 240 may vary. For example, the structure or the format of a state record 240 may be specific to a type of the data item on the source system 104 being migrated. For instance, a state record 240 may be formatted differently for file, email, contact, task, or calendar items. As an illustration, the state record 240 for an email item may include a date 250 that corresponds with the sent date of the email, but a date 250 might not be included for a contact item.

A state record 240 may include a number of fields. For example, a non-exhaustive list of fields that a state record 240 may include is: a timestamp 242 field that describes the date and time the state record 240 was created, an item ID field 244 from the source system 104, a folder path field 246 from the source system 104, a title field 248 (e.g. the subject line of an email for email items), a date 250 (e.g. the sent date of an email for email items), and a next action 252, described in more detail below.

Next action 252 may indicate an action that can be carried out by migration engine 106 on a particular data item corresponding to the state record 240 for a next pass of migration. In implementations, as mentioned above, next action 252 for the particular data item can be determined by the state tracker 116 during a migration pass. For example, based on an event emitted by the migration engine that the particular data item was not successfully migrated to the destination system 108, the state tracker 116 may modify the state record 240 for the particular data item to indicate the particular data item needs to be migrated in a next pass of the migration. As also described above, next action 252 can be modified by a migration routine, such as a script, a collection of analytics tool or a debugging tool, that run prior to the execution of data migration by the migration engine 106.

In some implementations, next action 252 may be taken from an action table, which can comprise a set of actions that may be taken on items. Actions that may be taken on an item may include, but are not limited to, migrate, skip, delete, and replace (replace is delete plus migrate). A next action 252 may be changed by the state tracker 116 using commands from the pass record 220.

As shown, a state record 240 may include a set of records 260. As shown, a given action record in the set, such as action record 270, can comprise a number of fields. The action record 270 can represent a record of a single migration action taken on a data item identified by the item ID 244. The action records 260, comprising multiple action records 270, can thus be used to indicate a migration history for the data item identified by the item ID 244. Such a migration history can be used for determining an appropriate action to taken for the data item identified by the item ID 244. For example, the migration engine plugin 110 can analyze the action records 260 to determine that the data item was attempted to be migrated more than a threshold of number of times during previous passes and thus an alert should be generated for an administrator of migration system 100. As another example, the action records 260 can be presented in a graphical user interface upon inquiry by a user, such as an administrator of the migration system 100.

The action record 270 may include a number of fields; a non-exhaustive list of such fields is as follows: a timestamp 272, a pass ID 274, a source address 276, a target address 278, an action 280, a status 282, a destination ID 284, and/or any other fields. The timestamp 272 can be used to indicate a date and time the action 280 was taken on the data item. The pass ID 274 can be used to indicate a particular pass in which the action 280 was taken on the data item. The source address 276 can be used to indicate an address of the source system 104, e.g. in an email migration, the mailbox address on the source system 104. The destination address 278 can be used to indicate an address of the destination system 108, e.g. in an email migration, the mailbox address on the destination system 108. The action 280 can be used to indicate an instruction or a command that was executed for migrating the data item during the pass indicated by the pass ID 274. In some implementations, the instruction or the command in the action 280 can be taken from an action table, e.g. migrate, skip, delete, replace. The status 282 can be used to describe a status of the data item at the end of the pass identified by the pass ID 274, e.g. whether the item has been migrated or not to the destination system 108. The destination ID 284 that may be generated by the destination system 108, and which may be used for various operations. For example, it may be used to optimize some batch processes like delete-and-replace operations. In that example, where a number of items have been migrated as part of a final pass and need to be re-migrated because one or more of their properties have changed, those items can be searched for by destination ID 284 and delete calls may be issued against the items with those destination IDs, without having to do anything else against the destination system 108. This may be a low I/O method of completing operations that require items to be found at the destination system.

In some exemplary implementations, the action record 270 can be generated from fields 242, 244, 246, 28, 250, and 252 in the state record. For example, at the end of the of a migration pass, the action record 270 for the pass can be created from those fields and stored in the state record 240.

III. Creating and Running the Migration System

A. Creating the Migration System

In some embodiments, the state record-enabled migration system may be created as follows. A migration engine 106, pulser 140, and engine plugin 110 can be created. The engine plugin 110 can be initialized with the migration engine 106. Each component of engine plugin 110, e.g., 112, 114, 116, 118 and 120, may be a separate object in migration system 100. However, this is not necessarily the only case. In some examples, some or all of the functions attributed to plugin components as described above can be combined into a single plugin component. For example, in some embodiments, error tracker 112 and state tracker 116 can be combined to form a combined tracker capable of tracking errors during a pass of the migration and as well as migration state of individual data items during the pass.

When the migration is performed for the very first time during the cycle, state file 200 may not have existed. In some embodiments, the engine plugin 110 can be configured to generate state file 200 during an initial pass of the migration. For example, the state tracker 116 can be configured to create state records during the initial pass and save the state records to the state file 200. However, this is not necessarily the only case. In some other examples, state file 200 may be readily available even prior to the first pass of the migration. For instance, the migration routine mentioned above, e.g., a script, can be used to generate state file 200 when the migration profile is invoked for the first time by the migration routine.

In any case, prior to pass(es) subsequent to the initial pass, the migration profile can be invoked to modify the state file 200 as described above. At the start of the migration pass, the state file 200 can then be loaded into memory, e.g., memory 130, to assist the migration. Also described above, state table 160 can be generated in the memory as an incarnation of the state file 200 during the migration. The state table 160 can be periodically or non-periodically flushed to storage to update the state file 200 during the migration. In some implementations, the engine plugin 110 can directly update the state file 200 after certain migration events have been detected. For example, certain critical system errors such as running out of disk space on the destination system 108 can be written to the state file 200 directly. In this way, some other components or systems that also use state file 200 can be alerted with those events. For example, a migration monitor can be implemented to periodically load the state file from storage 142 to monitor migration progresses. In that example, direct updates to the state file can facilitate in-time reports for the migration monitor.

As mentioned above, the life cycle of the migration by the migration system 100 can include multiple passes. The initial pass can be run by migration engine 106 to migrate data items on the source system to the destination system for the first time. During the initial pass, state file 200 can be generated and stored on storage 142. In a subsequent pass to the initial pass, migration profile 164 can be invoked prior to the start of data migration. The invocation of the migration profile 164 can cause the state records 240 in the state file 200 to be modified. At the start of the subsequent pass, the state file 200 can be loaded into the memory as a stable 160. An engine plugin 110 can be run to read the state records 240 in the state table 160 so to influence the performance of the migration by the migration engine 106. The engine plugin 110 can also track the events emitted by the migration engine 106 and to modify the state records 240 in the state table 160. Changes in the state table 160 can be flushed to the state file 200 periodically during the migration pass or can be saved to the state file 200 at the end of the migration pass. This migration pass can be repeated multiple times until the cutover time when the destination system 108 replaces the source system 104.

B. Running the Migration System

There may be a hierarchical structure of data directories on the source system 104. For example, a mailbox can be considered as a top level data directory and can contain mailbox folders. The folders can contain batches (i.e. collections of item metadata that allow the item to be identified and/or a state record 240 for that item to be retrieved or created) and items that the state record system tracks and persists through the migration.

Events may be emitted whenever the migration of any data items in a given directory (e.g. mailbox, folder, batch) is started, finished, or results in an error. Events may be emitted according to the hierarchical content structure in the source system 104. For example, in some embodiments the mailbox starts, then a folder starts, then a batch within the folder starts, then an item within the batch starts; start events may be emitted for all such occurrences. Eventually, all items in the batch may be finished, all batches in the folder may be finished, and all folders in the mailbox may be finished; finish events may be emitted for all such occurrences. A migration profile can be updated and invoked multiple times during the life cycle of the migration as described above. The invocation of migration profile can cause the state records in the state file to be modified in accordance with the migration action specified in the migration profile.

1. Multiple Invocations of a Migration Profile

As mentioned in section III.A, during the life cycle of the migration, multiple migration passes can be run. Prior to the data migration in a particular migration pass, the migration profile can be invoked by a migration routine. As mentioned above, in some embodiments, the migration routine can be a script that run independently from the data migration, and in some other embodiments the migration routine may be a process that triggers the migration engine 106 to perform the data migration.

Figure 3:
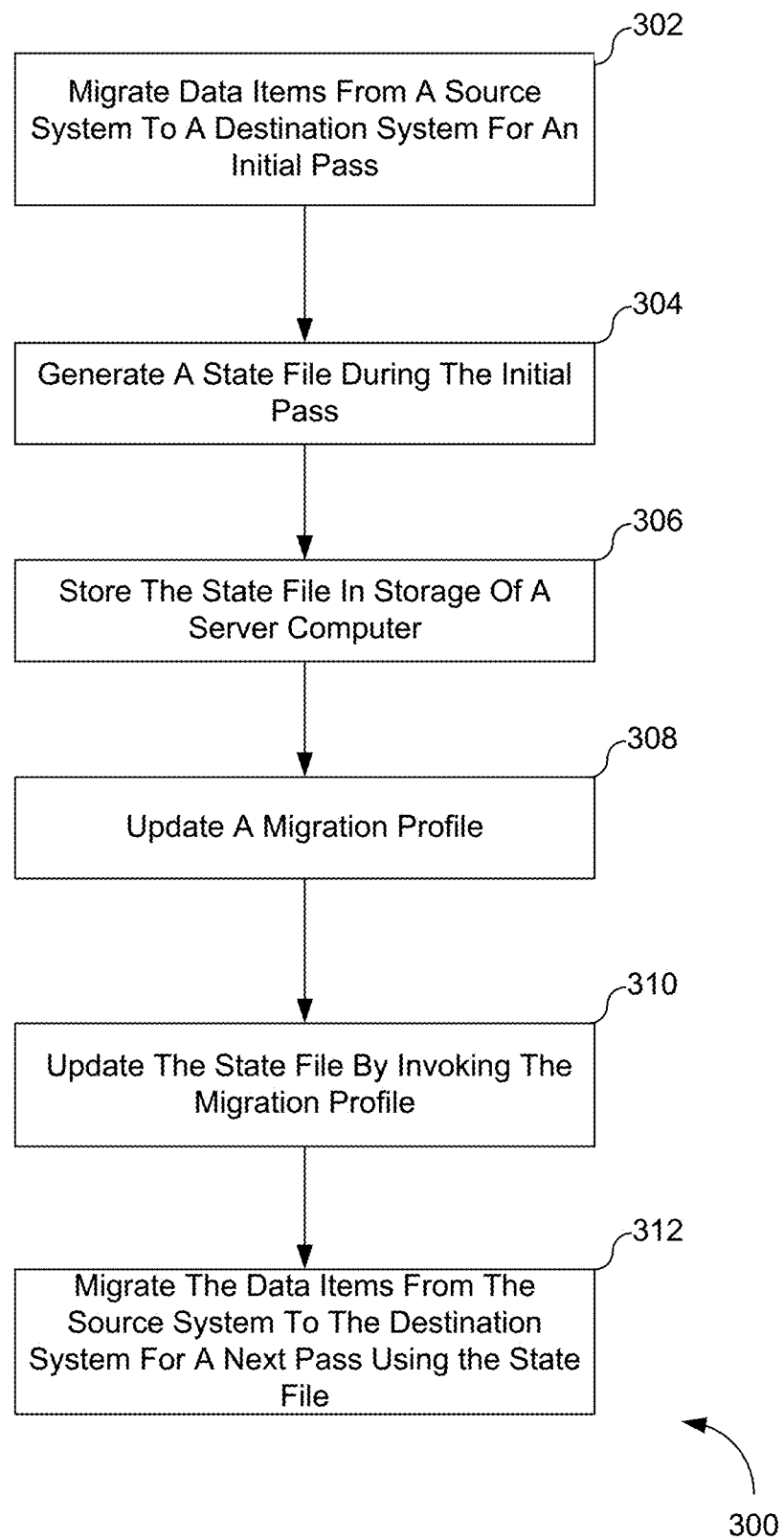
FIG. 3 is a flow chart of exemplary operations carried out in a migration system by invoking a migration profile file according to some embodiments.

FIG. 3 is a flow chart of data operations carried out in a migration system by invoking a migration profile file according to some embodiments. The operations of method 300 presented below are intended to be illustrative. In some embodiments, method 300 may be accomplished with one or more additional operations not described and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At 302, data items in a data directory (e.g., a mailbox, a folder, a calendar) can be migrated from a source system to a destination system for an initial pass. In some implementations, a migration engine the same as or substantially similar to the migration engine 106 can be employed to perform operations involved in 302.

At 304, a state file can be generated during the initial pass. The state file generated at 304 can include multiple state records for the data items in the data directory being migrated as described and illustrated herein. In some implementations, a plugin to migration engine the same as or substantially similar to the engine plugin 110 can be employed to perform operations involved in 304.

At 306, the state file generated at 304 can be stored in a data storage associated with a server computer, such as storage 142 shown in FIG. 1. In some implementations, a plugin to migration engine the same as or substantially similar to the engine plugin 110 can be employed to perform operations involved in 306.

At 308, a migration profile can updated. In some implementations, the migration profile can be updated by an administrator of the migration system via a graphical user interface. For example, the graphical user interface can be provided to enable the administrator to specify a migration action to be performed on one or more data items matching certain criteria. As another example, a migration routine such as a script can be used to update the migration profile. For instance, the script can be used to specify a migration action to be performed for certain type of data items during the next pass. In these ways, a capability to override or augment next actions in the state records for those items can be provided.

At 310, the state file generated at 304 can be updated by invoking the migration profile. As described above, in some implementations, the migration profile can be invoked by a migration routine. In some implementations, the migration routine can include a migration script configured to invoke the migration profile prior to the migration by the migration engine. In those implementations, the migration routine can run independent from the data migration performed by the migration engine. For example, the migration script can be run on a nightly basis to invoke the migration profile to update the state file. However, this is not necessarily the only case. In some other implementations, the migration profile can be updated as part of a migration pass. For example, the migration routine can invoke the migration profile first and then trigger the migration engine to start migrating the data items. In some other implementations, a plugin to migration engine the same as or substantially similar to the engine plugin 110 can be employed to perform operations involved in 310.

At 312, the data items in the data directory can be migrated from the source system to the destination system for a next pass subsequent to the initial pass using the state file. As described above, the state file can be loaded into memory prior to the next pass to create a state table. The state table can then be used to provide instructions as to what actions to be performed on the data items during the next pass. In some implementations, a migration engine and a migration engine plugin the same as or substantially similar to the migration engine 106 and engine plugin 110 can be configured to perform operations involved in 312.

2. Migrating Data Directory in a Migration Pass

Figure 4:
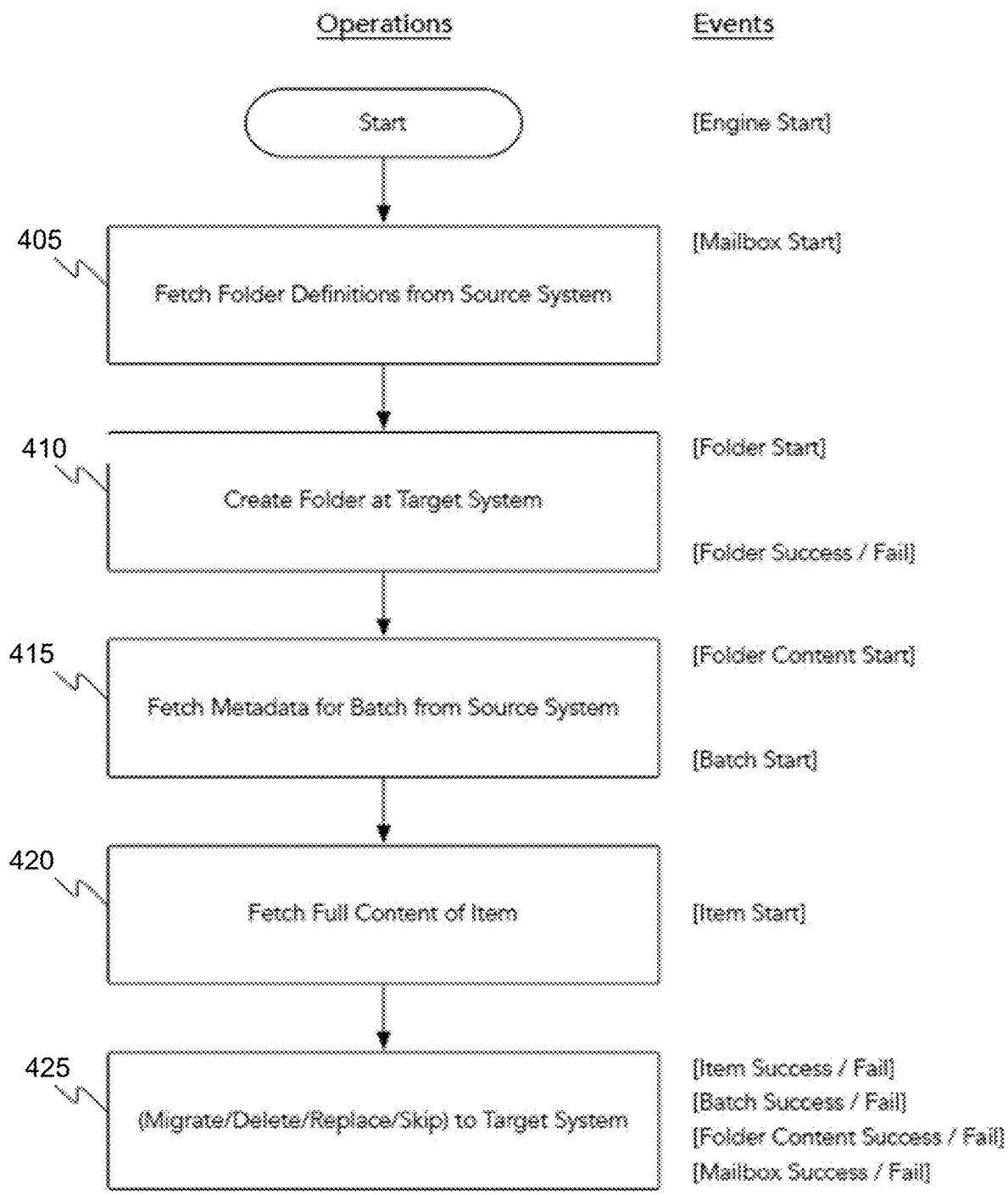
FIG. 4 is a flow chart of exemplary operations carried out in a migration pass to migrate data items in a data directory according to some embodiments.

During a migration pass, a data directory such as a mailbox or file folder can be processed hierarchically. In some implementations, the migration of data directory can be carried out in a breadth-first manner. As illustration, data items in the top-most level of the data directory can be migrated first and then data items in one or more sub-directories can be processed next iteratively in the same breadth-first manner. In some other implementations, the migration of data directory can be carried out in a depth-first manner. As another illustration, each sub-directory at the top-most level of the data directory can be processed first such that the sub-directories FIG. 4 is a flow chart of exemplary operations carried out in a migration pass to migrate data items in a data directory according to some embodiments. The operations of method 400 presented below are intended to be illustrative. In some embodiments, method 400 may be accomplished with one or more additional operations not described and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

In some embodiments, at the start of a migration pass, the migration engine 106 retrieves definitions of one or more folders in a data directory such as a mailbox from the source system 104 at 405.

At this point, the folder start events may be emitted and folder(s) (without contents) may be migrated to the destination system 108 at 410. A folder success/fail event may then be triggered depending on whether the folder(s) were successfully created at the destination system 108.

A folder success event may trigger a folder content start event, where batch metadata is retrieved from the source system 104 at 415, as well as a batch start event.

Next, an item start event is triggered for each item, and the full content of each item is retrieved from the source system 104 at 420.

The data is transferred to the destination system 108 at 425, which rolls up the hierarchy to the finish event, success or failure for the item, then batch, then folder content, then mailbox. The engine plugin 110 can track the events and report information via the pulser 140, while the migration engine 106 performs the data operations. The command at 325 can be changed based on the next action 252 by the state tracker 116.

IV. Computer System

Figure 5:
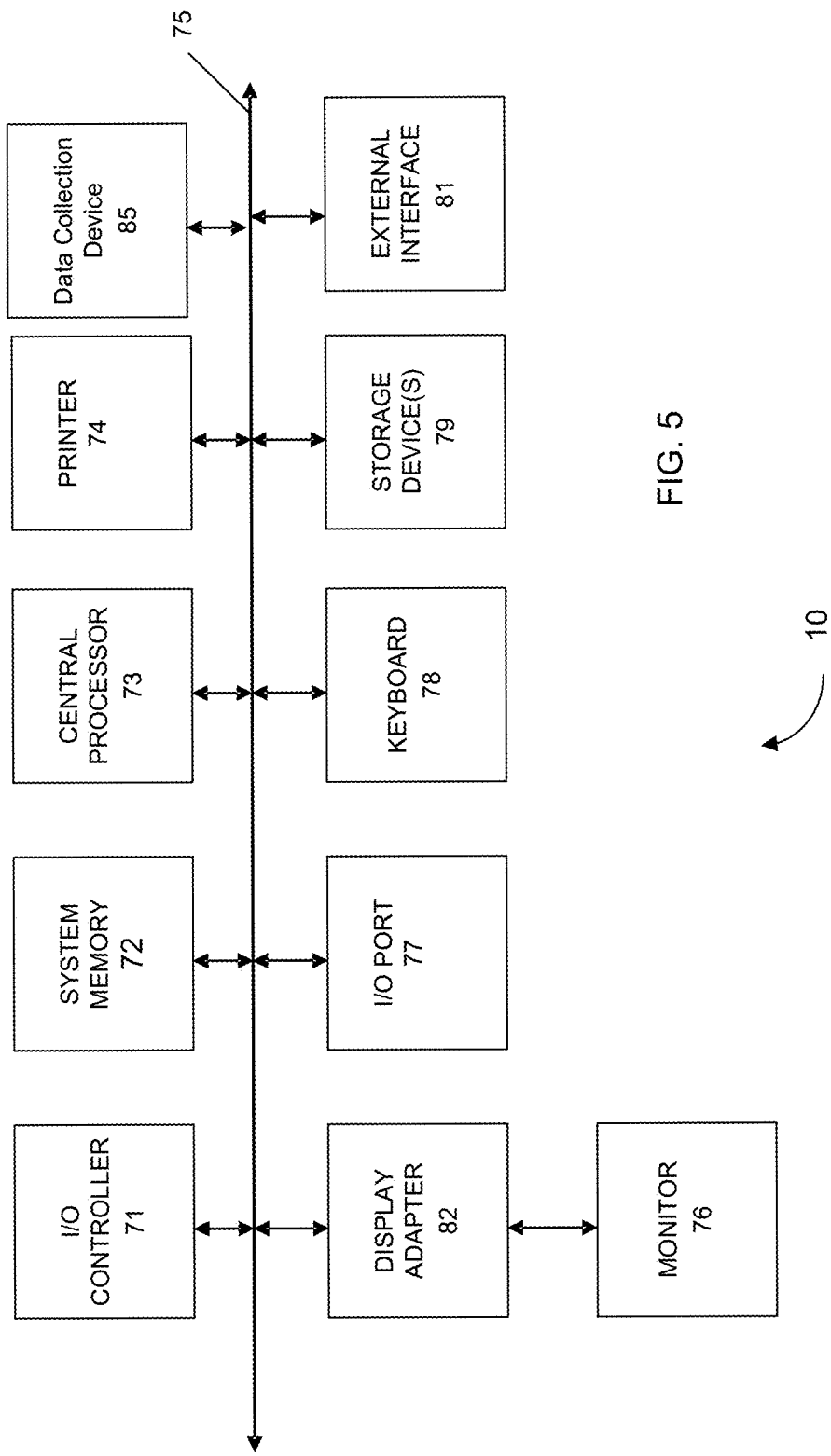
FIG. 5 shows a block diagram of an example computer system 10 usable with system and methods according to some embodiments.

Any of the computer systems mentioned herein may utilize any suitable number of subsystems. Examples of such subsystems are shown in FIG. 5 in computer system 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 5 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that various embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner. However, other embodiments may be directed to specific embodiments relating to each individual aspect, or specific combinations of these individual aspects.

The above description of exemplary embodiments has been presented for the purposes of illustration and description. It is not intended to be exhaustive or to limit embodiments to the precise form described, and many modifications and variations are possible in light of the teaching above. The embodiments were chosen and described in order to best explain the principles of various embodiments and their practical applications to thereby enable others skilled in the art to best utilize various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned here are incorporated by reference in their entirety for all purposes. None is admitted to be prior art.

What is claimed is:

1. A method for facilitating migration of data items in a data directory from a source system to a destination system over multiple invocations of a migration profile for migrating the data directory, the method being electronically executed by a server computer system and comprising:
    in an initial pass of migrating the data items in the data directory from the source system to the destination system, generating, by a migration engine plugin, a state file, the state file comprising state records for the data items in the data directory, each of the state records specifying a next action to be performed for one of the data item corresponding to the state record during a next pass of the migration, the next pass being subsequent to the initial pass, wherein the state record includes a first state record for a first data item, the first state record specifying the next action to be performed for the first data item when migrating the first data item from the source system to the destination system during the next pass;
    storing the state file in memory of the server computer system;
    updating the migration profile by specifying a migration action to be performed on one or more of the data items for the next pass such that the migration action is to be performed on the first data item when migrating the first data item from the source system to the destination system during the next pass, wherein the migration profile is separate and distinct from the state file;
    invoking, by a migration routine, the migration profile to update the state file, the updating of the state file comprises updating the next action in the first state record for the first data item in accordance with the migration action; and
    in the next pass of migrating the data items in the data directory from the source system to the destination system, executing, by the migration engine plugin, the updated next action in the first state record for the first data item.

2. The method of claim 1, wherein the updated next action in the first state record for the first data item includes at least one of a migrate instruction, a delete instruction, a replace instruction, and a skip instruction.

3. The method of claim 1, wherein the migration of the data items in the data directory for the initial pass further includes
    identifying, for each of the data items, by the migration engine plugin, an event reflecting whether the data item succeeds or fails to be migrated to the destination system;
    determining, for each of the data items, by the migration engine plugin, the next action to be performed for the data item based on the event identified for the data item; and
    updating, by the migration engine plugin, the state records for the data items with the determined next actions for the data items.

4. The method of claim 1, wherein the first state record includes one or more action records reflecting a migration history of the first data item.

5. The method of claim 4, wherein each of the action records comprises a composite key that includes an item identifier of the source system and a folder path of the item in the source system.

6. The method of claim 1, wherein the data items in the data directory include at least one of a file, an electronic mail message, a calendar item, a task item and a contact item.

7. The method of claim 1, wherein the state file further comprises a pass record indicating a status of the migration of the data items for the initial pass.

8. The method of claim 1, further comprising flushing the state file periodically to a persistent data storage.

9. The method of claim 1, further comprising providing a graphical user interface to enable a user to generate instructions for updating the migration profile.

10. A computer server for facilitating migration of data items in a data directory from a source system to a destination system over multiple invocations of a migration profile for migrating the data directory, the computer server comprising one or more hardware processors configured by machine-readable instructions to perform:
    in an initial pass of migrating the data items in the data directory from the source system to the destination system, generating, by a migration engine plugin, a state file, the state file comprising state records for the data items in the data directory, each of the state records specifying a next action to be performed for one of the data item corresponding to the state record during a next pass of the migration, the next pass being subsequent to the initial pass, wherein the state record includes a first state record for a first data item, the first state record specifying the next action to be performed for the first data item when migrating the first data item from the source system to the destination system during the next pass;
    storing the state file in memory of the computer server;
    updating the migration profile by specifying a migration action to be performed on one or more of the data items for the next pass such that the migration action is to be performed on the first data item when migrating the first data item from the source system to the destination system during the next pass, wherein the migration profile is separate and distinct from the state file;

invoking, by a migration routine, the migration profile to update the state file, the updating of the state file comprises updating the next action in the first state record for the first data item in accordance with the migration action; and in the next pass of migrating the data items in the data directory from the source system to the destination system, executing, by the migration engine plugin, the updated next action in the first state record for the first data item.

11. The computer server of claim 10, wherein the updated next action in the first state record for the first data item includes at least one of a migrate instruction, a delete instruction, a replace instruction, and a skip instruction.

12. The computer server of claim 10, wherein the migration of the data items in the data directory for the initial pass further includes identifying, for each of the data items, by a migration engine plugin, an event reflecting whether the data item succeeds or fails to be migrated to the destination system;

determining, for each of the data items, by the migration engine plugin, a next action to be performed for the data item based on the event identified for the data item; and updating, by the migration engine plugin, the state records for the data items with the determined next actions for the data items.

13. The computer server of claim 10, wherein the first state record includes one or more action records reflecting a migration history of the first data item.

14. The computer server of claim 13, wherein each of the action records comprises a composite key that includes an item identifier of the source system and a folder path of the item in the source system.

15. The computer server of claim 10, wherein the data items in the data directory include at least one of a file, an electronic mail message, a calendar item, a task item and a contact item.

16. The computer server of claim 10, wherein the state file further comprises a pass record indicating a status of the migration of the data items for the initial pass.

17. The computer server of claim 10, wherein the one or more processors are further configured by machine-readable instructions to perform flushing the state file periodically to a persistent data storage.

18. The computer server of claim 10, wherein the one or more hardware processors are further configured by machine-readable instructions to perform providing a graphical user interface to enable a user to generate instructions for updating the migration profile.

19. A non-transitory computer-readable medium storing computer-executable code for facilitating migration of data items in a data directory from a source system to a destination system over multiple invocations of a migration profile for migrating the data directory, the non-transitory computer-readable medium comprising:

code for, in an initial pass of migrating the data items in the data directory from the source system to the destination system, generating, by a migration engine plugin, a state file, the state file comprising state records for the data items in the data directory, each of the state records specifying a next action to be performed for one of the data item corresponding to the state record during a next pass of the migration, the next pass being subsequent to the initial pass, wherein the state record includes a first state record for a first data item that specifies the next action to be performed for the first data item, the first state record specifying the next action to be performed for the first data item when migrating the first data item from the source system to the destination system during the next pass;

code for storing the state file in memory of a server computer system;

code for updating the migration profile by specifying a migration action to be performed on one or more of the data items for the next pass such that the migration action is to be performed on the first data item when migrating the first data item from the source system to the destination system during the next pass, wherein the migration profile is separate and distinct from the state file;

code for invoking, by a migration routine, the migration profile to update the state file, the updating of the state file comprises updating the next action in the first state record for the first data item in accordance with the migration action; and code for, in the next pass of migrating the data items in the data directory from the source system to the destination system, executing, by the migration engine plugin, the updated next action in the first state record for the first data item.

20. The non-transitory computer-readable medium of claim 19, wherein the updated next action in the first state record for the first data item includes at least one of a migrate instruction, a delete instruction, a replace instruction, and a skip instruction.

* * * * *